March 31, 1964

E. M. STUBBLEFIELD 3,126,720

ABSORPTION REFRIGERATING MACHINE

Filed Feb. 15, 1962

INVENTOR.
EDWARD M. STUBBLEFIELD
BY
Holmes & Andersen
ATTORNEYS

March 31, 1964 E. M. STUBBLEFIELD 3,126,720
ABSORPTION REFRIGERATING MACHINE
Filed Feb. 15, 1962 2 Sheets-Sheet 2
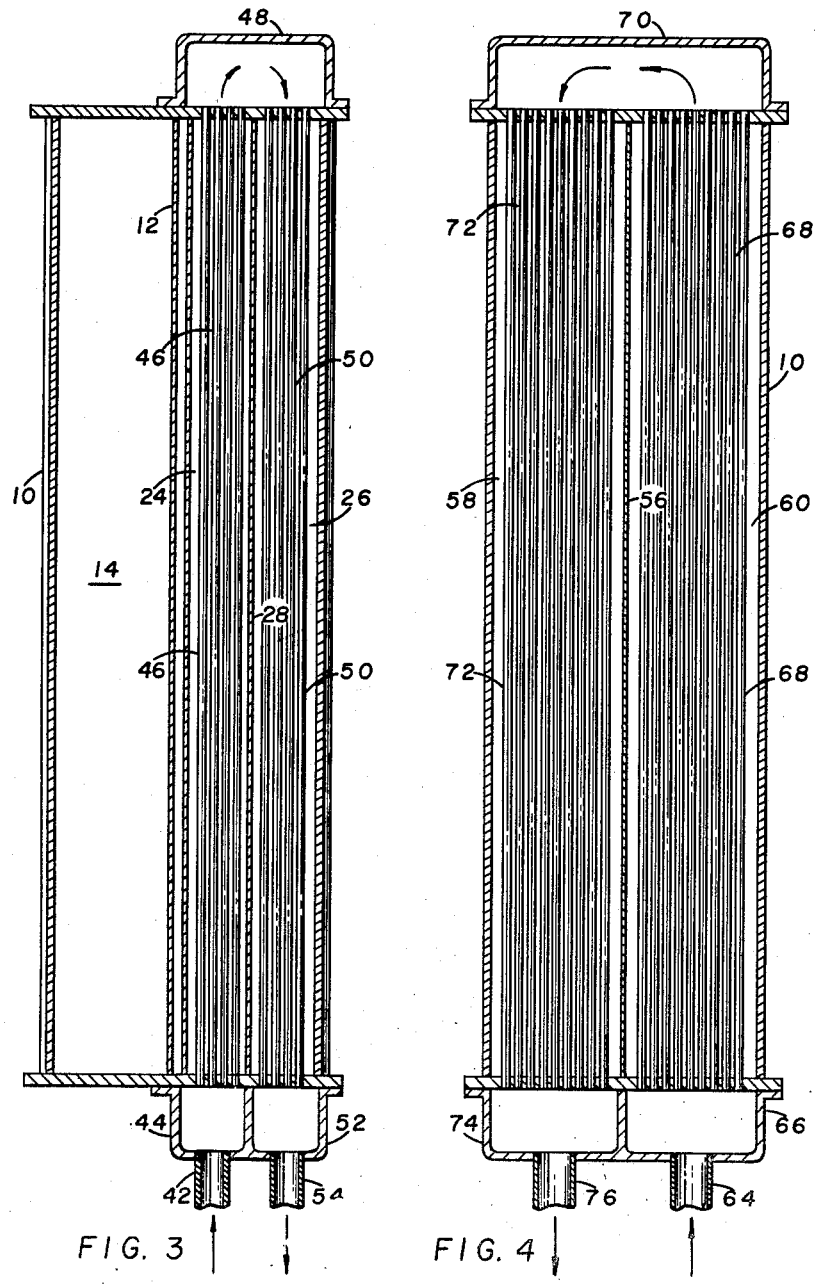
INVENTOR.
EDWARD M. STUBBLEFIELD
BY
Holmes & Andersen
ATTORNEYS

United States Patent Office 3,126,720
Patented Mar. 31, 1964

3,126,720
ABSORPTION REFRIGERATING MACHINE
Edward M. Stubblefield, La Crosse, Wis., assignor to The Trane Company, La Crosse, Wis., a corporation of Wisconsin
Filed Feb. 15, 1962, Ser. No. 173,484
11 Claims. (Cl. 62—335)

This invention relates to absorption refrigerating machines.

It is an object of this invention to increase the efficiency of an absorption refrigerating machine by providing a relatively low pressure absorber operating with relatively concentrated absorbent, and a relatively high pressure absorber operating with relatively less concentrated absorbent. It is another object of this invention to increase the efficiency of an absorption refrigerating machine by providing two evaporators, with a relatively low temperature evaporator in vapor flow communication with a relatively low pressure absorber and with a relatively high temperature evaporator in vapor flow communication with a relatively high pressure absorber.

It is another object of this invention to conduct the refrigerant from the condenser to the high temperature evaporator and to conduct refrigerant liquid from the high temperature evaporator to the low temperature evaporator.

It is another object of the invention to provide means for collecting liquid refrigerant from the bottom of both evaporators and to provide means for spraying the collected liquid refrigerant into both evaporators.

It is an object of the invention to conduct concentrated absorbent from the generator to the low pressure absorber and to conduct absorbent from the low pressure absorber to the high pressure absorber.

It is another object of the invention to provide an arrangement of evaporators and absorbers in a single shell for efficient flow of fluids.

It is another object of the invention to provide means for conducting cooling fluid first through the low pressure absorber and then through the high pressure absorber.

It is another object of this invention to provide means for conducting the fluid to be cooled first through the high temperature evaporator and then through the low temperature evaporator.

Other objects and advantages of this invention will become apparent as the specification proceeds to describe the invention with reference to the accompanying drawings in which:

FIGURE 3 is a cross-sectional view taken on line 3—3 of FIGURE 1; and

FIGURE 4 is a cross-sectional view taken on line 4—4 of FIGURE 1.

Figure 1:
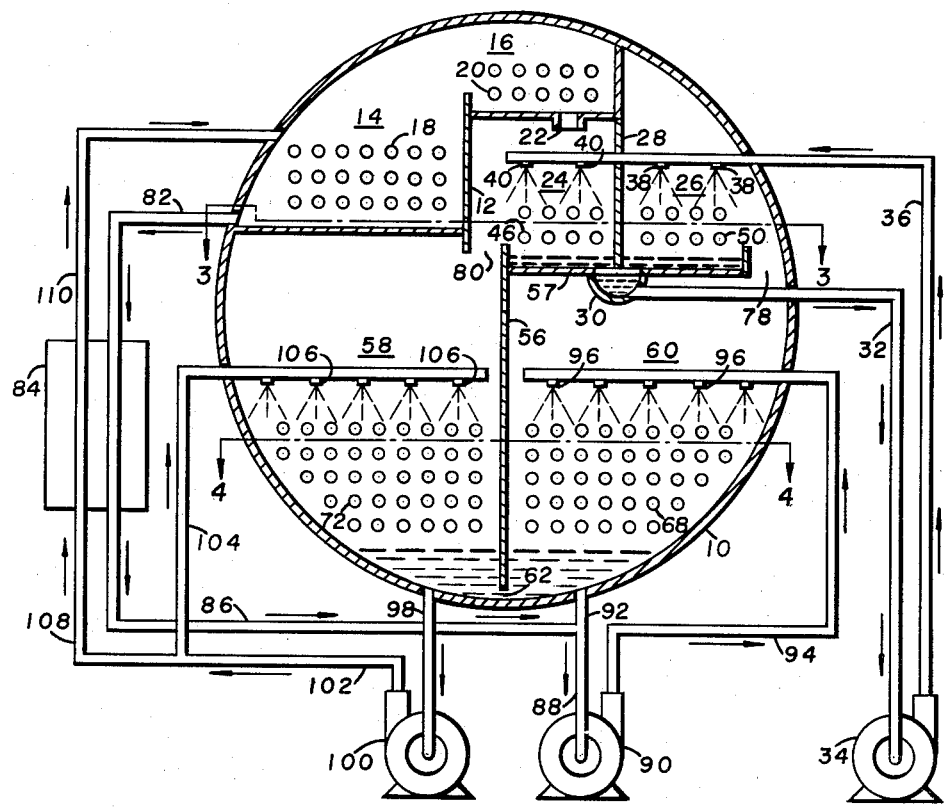
FIGURE 1 is a cross-sectional view, partly diagrammatic, of a preferred embodiment of the apparatus of this invention.

Referring now to FIGURE 1 of the drawing, the invention is embodied in an absorption refrigerating machine similar to that shown and described in U.S. patent of E. M. Stubblefield et al., No. 2,986,906, dated June 23, 1958.

A sealed shell 10 encloses the major components of the apparatus. A wall 12 is secured to the shell 10 to define a high pressure chamber containing a generator 14 and a condenser 16. Tubes 18 in the generator 14 conduct heating fluid in heat transfer relationship with the absorbent solution in the generator to vaporize refrigerant from the absorbent solution. The vaporized refrigerant flows to the condenser 16 where heat is removed by the cooling fluid flowing in tubes 20. The refrigerant vapor is condensed and flows through orifice 22 into the high temperature evaporator 24. A low temperature evaporator 26 is separated from the high temperature evaporator 24 by a wall 28. The level of refrigerant liquid in evaporators 24 and 26 is above the bottom of wall 28 to prevent the flow of vapor from evaporator 24 to evaporator 26. By this construction a liquid trap has been provided to maintain a lower pressure in evaporator 26 than in evaporator 24. Liquid refrigerant flows from both evaporators into a well 30 from which it is conducted by conduit 32 to the inlet of a pump 34. Pump 34 discharges into a conduit 36 which has spray nozzles 38 in evaporator 26 and spray nozzles 40 in evaporator 24.

Referring to FIGURE 3, the fluid to be cooled is moved by a pump (not shown) from the cooling load through a conduit 42 to an inlet header 44 from which it flows through tubes 46 of the high temperature evaporator 24. From the tubes 46, the fluid flows to a header 48 from which it flows into the tubes 50 of the low temperature evaporator 26. From the tubes 50 the cooled fluid flows into header 52 and thence through conduit 54 back to the cooling load.

A wall 56 extends longitudinally of the shell 10. Another wall 57 extends longitudinally of the shell 10 and forms the bottom of the evaporators 24 and 26. The wall 56 cooperates with the shell 10 and walls 57, 28, and 12 to provide in the lower portion of the interior of the shell 10 a chamber of intermediate pressure containing evaporator 24 and an absorber 58 which will be referred to as a high pressure absorber. These walls also cooperate with the shell 10 to provide a chamber of low pressure containing evaporator 26 and an absorber 60 which will be referred to as a low pressure absorber. An opening 62 between the wall 56 and the shell 10 provides for the flow of absorbent solution from the low pressure absorber 60 to the high pressure absorber 58. The level of solution in both absorbers is above the opening 62, and therefore no vapor can flow from one absorber to the other. By this construction a liquid trap has been provided to maintain a lower pressure in absorber 60 than in absorber 58.

Referring to FIGURE 4, the cooling fluid from a source such as a cooling tower or a well is moved by a pump (not shown) through conduit 64 to a header 66 and thence through tubes 68 of the low pressure absorber 60. From tubes 68 the cooling fluid flows into header 70 and thence through tubes 72 of the high pressure absorber 58. From tubes 72 the cooling fluid flows to header 74 and thence through conduit 76 back to the source or to waste.

Referring to FIGURE 1, it can be seen that low pressure absorber 60 draws vapor from low temperature evaporator 26 through opening 78, and high pressure absorber 58 draws vapor from high temperature evaporator 24 through opening 80.

The circulation of absorbent solution will now be described with reference to FIGURE 1. Concentrated absorbent solution flows from generator 14 through conduit 82 to heat exchanger 84, and thence through conduits 86 and 88 to pump 90. Solution from low pressure absorber 60 flows through conduit 92 and thence through conduit 88 to pump 90. It is thus seen that pump 90 receives concentrated solution from the generator 14 and a solution of intermediate concentration from the low pressure absorber 60. Pump 90 discharges into conduit 94 which has spray nozzles 96 in low pressure absorber 60.

The absorbent solution from spray nozzles 96 absorbs refrigerant vapor from evaporator 26 and is cooled by passing over tubes 68. The absorbent solution from absorber 60 having been partially diluted with refrigerant flows through opening 62 into the high pressure absorber 58.

Solution flows from the low pressure absorber 60 to the high pressure absorber 58 through opening 62. This solution mixes with the relatively more dilute solution dripping from tubes 72 and flows through conduit 98 to pump 100. Pump 100 discharges into conduit 102. Some of the solution flowing in conduit 102 flows through conduit 104 which has spray nozzles 106 in high pressure absorber 58. The solution from spray nozzles 106 absorbs refrigerant vapor from evaporator 24 and is cooled by passing over tubes 72. The remainder of the fluid flowing in conduit 102 flows through conduit 108 to heat exchanger 84 and thence through conduit 110 to generator 14 where it is concentrated.

Figure 2:
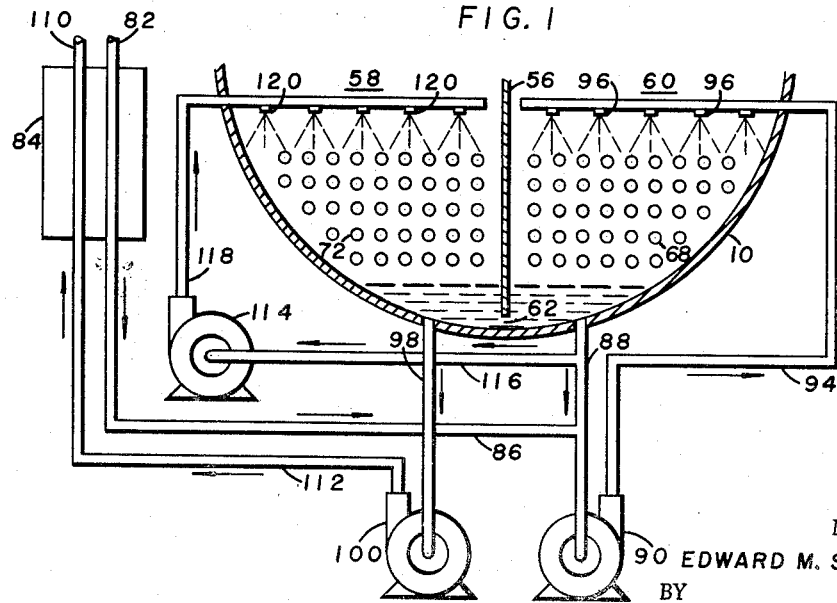
FIGURE 2 is a cross-sectional view, partly diagrammatic, of a modification of the apparatus of this invention.

The machine of FIGURE 2 is the same as that of FIGURE 1 except with respect to the circulation of absorbent solution. Pump 90 receives solution from conduits 86 and 88 and discharges solution through conduit 94 and nozzles 96, the same as in the form of FIGURE 1. Pump 100 receives solution through conduit 98 and discharges into conduit 112 from which the solution flows to heat exchanger 84. The form of FIGURE 2 has an additional solution pump 114 which receives solution from conduit 88 through conduit 116. Pump 114 discharges solution through conduit 118 and nozzles 120. In the form of FIGURE 2 there is substantially no flow through opening 62 during normal operation, because the solution is transferred by pump 114 from the low pressure absorber 60 to the high pressure absorber. However, opening 62 does permit some flow to insure that the levels in the absorbers 58 and 60 be substantially equal during all conditions of operation.

Although I have described specific embodiments of my invention, it is contemplated that various changes may be made without departing from the spirit of my invention, and I desire to be limited only by the claims.

I claim:

1. An absorption refrigerating machine comprising a first chamber operating at high pressure, a generator in said first chamber, a condenser in said first chamber, said condenser being in refrigerant flow communication with said generator to condense refrigerant from said generator, a second chamber operating at an intermediate pressure, a first evaporator in said second chamber, a first absorber in said second chamber, said first evaporator being in fluid flow communication with said first absorber, a third chamber operating at low pressure, a second evaporator in said third chamber, a second absorber in said third chamber, said second evaporator being in fluid flow communication with said second absorber, means for conducting refrigerant from said condenser to said first and said second evaporators, means for conducting absorbent solution from said generator to said second absorber, means for conducting absorbent solution from said second absorber to said first absorber and means for conducting absorbent solution from said first absorber to said generator.

2. An absorption refrigerating machine comprising a first chamber operating at high pressure, a generator in said first chamber, a condenser in said first chamber, said condenser being in refrigerant flow communication with said generator to condense refrigerant from said generator, a second chamber operating at an intermediate pressure, a first evaporator in said second chamber, a first absorber in said second chamber, said first evaporator being in fluid flow communication with said first absorber, a third chamber operating at low pressure, a second evaporator in said third chamber, a second absorber in said third chamber, said second evaporator being in fluid flow communication with said second absorber, means for conducting refrigerant from said condenser to one of said evaporators, means for conducting refrigerant from said one of said evaporators to the other of said evaporators, means for conducting absorbent solution from said generator to said second absorber, means for conducting absorbent solution from said second absorber to said first absorber and means for conducting absorbent from said first absorber to said generator.

3. An absorption refrigerating machine comprising a first chamber operating at high pressure, a generator in said first chamber, a condenser in said first chamber, said condenser being in refrigerant flow communication with said generator to condense refrigerant from said generator, a second chamber operating at an intermediate pressure, a first evaporator in said second chamber, a first absorber in said second chamber, said first evaporator being in fluid flow communication with said first absorber, a third chamber operating at low pressure, a second evaporator in said third chamber, a second absorber in said third chamber, said second evaporator being in fluid flow communication with said second absorber, means for conducting refrigerant from said condenser to said first evaporator, means for conducting refrigerant from said first evaporator to said second evaporator, means for conducting absorbent solution from said generator to said second absorber, means for conducting absorbent solution from said second absorber to said first absorber and means for conducting absorbent solution from said first absorber to said generator.

4. An absorption refrigerating machine comprising a first chamber operating at high pressure, a generator in said first chamber, a condenser in said first chamber, said condenser being in refrigerant flow communication with said generator to condense refrigerant from said generator, a second chamber operating at an intermediate pressure, a first evaporator in said second chamber, a first absorber in said second chamber, said first evaporator being in fluid flow communication with said first absorber, a third chamber operating at low pressure, a second evaporator in said third chamber, a second absorber in said third chamber, said second evaporator being in fluid flow communication with said second absorber, means for conducting refrigerant from said condenser to said first evaporator, spray means in at least one of said evaporators, a pump for pumping liquid refrigerant from said first and said second evaporator to said spray means, means for conducting absorbent solution from said generator to said second absorber, means for conducting absorbent solution from said second absorber to said first absorber and means for conducting absorbent solution from said first absorber to said generator.

5. An absorption refrigerating machine comprising a first chamber operating at high pressure, a generator in said first chamber, a condenser in said first chamber, said condenser being in refrigerant flow communication with said generator to condense refrigerant from said generator, a second chamber operating at an intermediate pressure, a first evaporator in said second chamber, a first absorber in said second chamber, said first evaporator being in fluid flow communication with said first absorber, a third chamber operating at low pressure, a second evaporator in said third chamber, a second absorber in said third chamber, said second evaporator being in fluid flow communication with said second absorber, means for conducting refrigerant from said condenser to said first and said second evaporators, means for conducting absorbent solution from said generator to said second absorber, means for conducting absorbent solution from said second absorber to said first absorber, means for conducting absorbent solution from said first absorber to said generator, and means for conducting cooling fluid in series through said absorbers with the cooling fluid passing first in heat transfer relationship with said second absorber and then in heat transfer relationship with said first absorber.

6. An absorption refrigerating machine comprising a first chamber operating at high pressure, a generator in said first chamber, a condenser in said first chamber, said condenser being in refrigerant flow communication with said generator to condense refrigerant from said generator, a second chamber operating at an intermediate pressure, a first evaporator in said second chamber, a first absorber in said second chamber, said first evaporator being in fluid flow communication with said first absorber, a third chamber operating at low pressure, a second evaporator in said third chamber, a second absorber in said third chamber, said second evaporator being in fluid flow communication with said second absorber, means for conducting refrigerant from said condenser to said first and said second evaporators, means for conducting absorbent solution from said generator to said second absorber, means for conducting absorbent solution from said second absorber to said first absorber, means for conducting absorbent solution from said first absorber to said generator, and means for conducting fluid to be cooled in series through said evaporators with the fluid to be cooled passing first in heat transfer relationship with said first evaporator and then in heat transfer relationship with said second evaporator.

7. An absorption refrigerating machine comprising a first chamber operating at high pressure, a generator in said first chamber, a condenser in said first chamber, said condenser being in refrigerant flow communication with said generator to condense refrigerant from said generator, a second chamber operating at an intermediate pressure, a first evaporator in said second chamber, a first absorber in said second chamber, said first evaporator being in fluid flow communication with said first absorber, a third chamber operating at low pressure, a second evaporator in said third chamber, a second absorber in said third chamber, said second evaporator being in fluid flow communication with said second absorber, means for conducting refrigerant from said condenser to said first and second evaporators, means for conducting absorbent solution from said generator to said second absorber, means for conducting absorbent solution from said second absorber to said first absorber and means for conducting absorbent solution from said first absorber to said generator, means for conducting cooling fluid in series through said absorbers with the cooling fluid passing first in heat transfer relationship with said second absorber and then in heat transfer relationship with said first absorber, and means for conducting fluid to be cooled in series through said evaporators with the fluid to be cooled passing first in heat transfer relationship with said first evaporator and then in heat transfer relationship with said second evaporator.

8. An absorption refrigerating machine comprising a unitary sealed elongated shell having therein an absorbent and a refrigerant, two elongated walls extending longitudinally of said shell and secured to the wall of said unitary sealed shell to divide the interior of said shell into a high pressure chamber, an intermediate pressure chamber, and a low pressure chamber, a generator and a condenser in the high pressure chamber, said condenser being in refrigerant flow communication with said generator to condense refrigerant from said condenser, a first evaporator and a first absorber in the intermediate pressure chamber, a second evaporator and a second absorber in said low pressure chamber, means for conducting refrigerant from said condenser to said evaporators, means for conducting absorbent solution from said generator to said second absorber, means for conducting absorbent solution from said first absorber to said generator, and means for conducting absorbent solution from said second absorber to said first absorber.

9. Apparatus as set forth in claim 8 in which the last recited means comprises a passageway between the intermediate pressure chamber and the low pressure chamber with the passageway being entirely below the levels of absorbent solution in both the intermediate pressure chamber and the low pressure chamber.

10. Apparatus as set forth in claim 8 in which the last recited means comprises a pump having its inlet connected to said low pressure chamber to receive solution therefrom and having its outlet connected to said intermediate pressure chamber to deliver absorbent solution thereto.

11. An absorption refrigerating machine comprising a first chamber operating at high pressure, a generator in said first chamber, a condenser in said first chamber, said condenser being in refrigerant flow communication with said generator to condense refrigerant from said generator, a second chamber operating at an intermediate pressure, a first evaporator in said second chamber, a first absorber in said second chamber, said first evaporator being in fluid flow communication with said first absorber, a third chamber operating a low pressure, a second evaporator in said third chamber, a second absorber in said third chamber, said second evaporator being in fluid flow communication with said second absorber, means for conducting absorbent solution from said generator to said second absorber, means for conducting absorbent solution from said second absorber to said first absorber, means for conducting absorbent solution from said first absorber to said generator, means for conducting refrigerant from said condenser to said first evaporator, spray means in said second evaporator, a pump connected to receive refrigerant from said first and second evaporators and having its discharge connected to said spray means, and a liquid trap between said first and said second evaporators to maintain a differential in pressure between said evaporators and to provide for the flow of refrigerant liquid between said evaporators.

References Cited in the file of this patent
UNITED STATES PATENTS

| | | |
|---|---|---|
| 2,983,117 | Edberg et al. | May 9, 1961 |
| 2,986,906 | Stubblefield et al. | June 6, 1961 |